United States Patent
Bussey, Jr. et al.

(10) Patent No.: US 7,293,971 B2
(45) Date of Patent: Nov. 13, 2007

(54) APPARATUS FOR MAKING LOOSE FILL ELEMENTS AND ELEMENT MADE THEREBY

(76) Inventors: Harry Bussey, Jr., 960 Cape Marco Dr., Unit 1803, Marco Island, FL (US) 33937; Buddy Harry Bussey, III, 4 Winoy Hill, Atlantic Highlands, NJ (US) 07716

( * ) Notice: Subject to any disclaimer, the term of this patent is extended or adjusted under 35 U.S.C. 154(b) by 312 days.

(21) Appl. No.: 10/944,607

(22) Filed: Sep. 17, 2004

(65) Prior Publication Data

US 2006/0062962 A1    Mar. 23, 2006

(51) Int. Cl.
  B29C 47/34    (2006.01)
  B29C 47/88    (2006.01)
  B29C 55/30    (2006.01)
(52) U.S. Cl. .................. 425/71; 425/315; 425/817
(58) Field of Classification Search ............ 425/71, 425/377, 378.1, 315, 316
  See application file for complete search history.

(56) References Cited

U.S. PATENT DOCUMENTS 2,294,555 A * 9/1942 Hendrie .................. 264/210.1
3,723,035 A * 3/1973 Franke ......................... 425/71
3,988,085 A * 10/1976 Krchma ....................... 425/71
4,169,179 A * 9/1979 Bussey, Jr. ................. 428/159
4,261,940 A * 4/1981 Bussey, Jr. .................. 264/53
RE33,492 E * 12/1990 Hunke ........................ 210/173
5,182,115 A * 1/1993 Nogossek et al. ............ 425/71
5,267,845 A * 12/1993 Anderlind et al. ........... 425/71
5,441,394 A * 8/1995 Keilert et al. ................ 425/71
6,039,905 A * 3/2000 Zollitsch et al. ............ 264/143

* cited by examiner

Primary Examiner—Robert Davis
Assistant Examiner—Emmanuel S Luk
(74) Attorney, Agent, or Firm—Francis C. Hand; Carella, Byrne, Bain etal.

(57) ABSTRACT

A packaging element is formed with a cross-section including a central portion, a first leg extending from one end of the central portion and a second leg extending from the opposite end of the central portion that is directed toward the first leg to at least partially enclose an opening between the legs. The packing element is made by passing a C-shaped extrudate of thermoplastic material containing an expanding agent about a guide roller with the legs of the extrudate directed away from the guide roller and within a water bath of a tank.

8 Claims, 2 Drawing Sheets

APPARATUS FOR MAKING LOOSE FILL ELEMENTS AND ELEMENT MADE THEREBY

This invention relates to an apparatus for making loose fill elements and to an element made thereby.

BACKGROUND OF THE INVENTION

As is known, various types of packing materials have been used to insulate articles being transported in shipping containers against the danger of damage from vibration and impact forces. In particular, it has been known to use resilient thermoplastic elements for the packing materials. In many cases, these elements have been produced in shapes to provide not only a cushioning effect for the article being shipped but also a nesting relation or interlocking arrangement with each other to prevent migration of the packaged article during the course of shipment.

Generally, when an article is to be packaged, an empty carton is first opened and a mass of elements is poured from a supply hopper or other container into the shipping carton to fill the carton part way. Thereafter, the article is placed in the carton and a further mass of elements is poured from the supply hopper or container into the carton to a point of overfilled. Next, the carton is closed in a manner such that the overfilled elements are pressed down into the carton. This causes the various elements to press together in an interlocking manner or a nesting manner depending on the shapes of the elements.

Heretofore, in order to manufacture resilient thermal packing elements, it has been know to extrude a heat-plastified mass of thermoplastic material containing an expanding agent through an orifice to form a rod which is then severed at longitudinal increments into discrete elements. In some cases, it has also been known to cool the rod after extrusion and prior to cutting. In such cases, the subsequently cut elements are of a latent foaming or expandable nature. That is, the elements can be subjected to heat at a later time to cause an expansion of the elements due to the expanding agent incorporated therein. Such latent foaming elements can be shipped in bulk to the ultimate user and thereafter expanded under heat into a useable state. Where the shapes of the element permit, the foamed elements can be poured from hoppers or the like into individual shipping containers.

As is known, resilient thermoplastic loose fill packaging elements have been manufactured in various shapes, such as E-shapes, C-shapes, S-shapes, U-shapes and various hooked shapes, such as described in U.S. Pat. No. 4,514,453. Because of the interlocking or nesting characteristics of C-shaped and U-shaped loose fill elements, these elements may interlock or nest while in a hopper so that jamming of the hopper occurs that prevents free flow of the elements out of the hopper. Also, these elements by interlocking may occupy less volume in a shipping container particularly due to settling. This, in turn, may give the user a false impression that there is a short-weight condition.

Accordingly, it is an object of the invention to provide a loose fill packing element which occupies a maximum space with a minimum of weight.

It is another object of the invention to provide loose fill packing elements which do not interlock or nest with each other.

It is another object of the invention to provide a packaging material made of packing elements that will not settle to any appreciable extent during shipment in containers.

It is another object of the invention to provide an apparatus for making a packing element of unique shape.

SUMMARY OF THE INVENTION

Briefly, the invention provides a loose fill packing element of resilient thermoplastic material having a cross section including a central portion, a first leg extending from one end of the central portion and a second leg extending from an opposite end of the central portion to define an opening with the first leg. In accordance with the invention, the second leg is directed toward the first leg to at least constrict the opening therebetween. The shape of the packing element may be characterized as a swirl shape.

The packing element may be made in a latent foaming, i.e. expandable state or an expanded state.

The shape of the expanded packing element is such that the inwardly directed second leg acts to preclude nesting or interlocking of another like element therein. Further, the inwardly directed leg partially envelopes the opening formed between the legs so that more air is shipped in a mass of free flowing elements. That is to say, the packing element occupies a maximum space with a minimum of weight. Still further, the shape of the packing element is such that when a multiplicity of the elements are poured into a shipping carton and the carton closed to compact the elements, the individual elements act as springs to maintain the elements in position without shifting within the carton.

The springiness of the elements is not lost should the elements interlock or nest within a carton.

An apparatus for making the loose fill elements comprises an extruder of conventional construction for extruding a heat-plastified mass of thermoplastic material containing an expanding agent. In this respect, the extruder has a die at one end with at least one orifice for extrusion of the heat-plastified mass there-through in a downward direction in a form in an elongated extrudate or rod. In accordance with the invention, the orifice is provided with a C-shaped cross section in order to form an extrudate with a C-shaped cross section having a pair of legs defining an opening therebetween.

In addition, the apparatus includes a tank that is disposed below the die for holding a bath of liquid, for example water, for cooling of the extrudate into a latent foaming state. Further, at least one guide roller is mounted in the tank within the bath of liquid for passage of the extrudate under and around the roller with the legs of the C-shaped cross section directed away from the guide roller. Further, a means is provided for pulling the cooled extrudate through the tank and about the guide roller and a cutter is provided for cutting the cooled extrudate passing from the pulling means into discrete pellets.

In accordance with the invention, upon passage of the extrudate under and about the guide roller, one of the legs of the extrudate deforms inwardly towards the other of the legs to at least partially close the opening therebetween. The reason for the deformation of the one leg rather than both legs towards each other is not fully understood. However, should the guide roller be skewed relative to the axis or path along which the extrudate moves downwardly from the die, the amount of deformation of the leg may be varied to a greater of lesser degree.

Further, the degree of deformation of the leg of the element may be varied by making that leg thicker or thinner than the other leg of the element. That is, the thinner the one leg, the more the deformation has been found to occur and vice versa.

Still further, the degree of deformation may be increased by turning the extrudate to one side so that one leg is brought against the roller to effect a bringing together of the two legs to form a flattened V-shaped cross-section.

The means for pulling the cooled extrudate may be in the form of a pair of pull rollers between which the extrudate is passed. Further, the pair of pull rollers and cutter may be incorporated into a pellitizer of known construction located downstream of the water-filled tank.

The packing element is made with a uniform thickness,s for example in a range of from ⅛ in ⅜ inch. Thus, as the latent foaming elements are expanded, the rates of expansion of the various parts of the element are substantially uniform. This allows the expending element to expand faster and to cure faster. Also, during expansion and curing, air passes over and around the element. Because the element provides more surface area per pound of weight than a conventional element of non-uniform thickness, the element dries in a more uniform and faster manner.

BRIEF DESCRIPTION OF THE DRAWINGS

These and other objects and advantages of the invention will become more apparent from the following detailed description taken in conjunction with the accompanying drawings wherein.

DETAILED DESCRIPTION OF THE INVENTION

Figure 1:
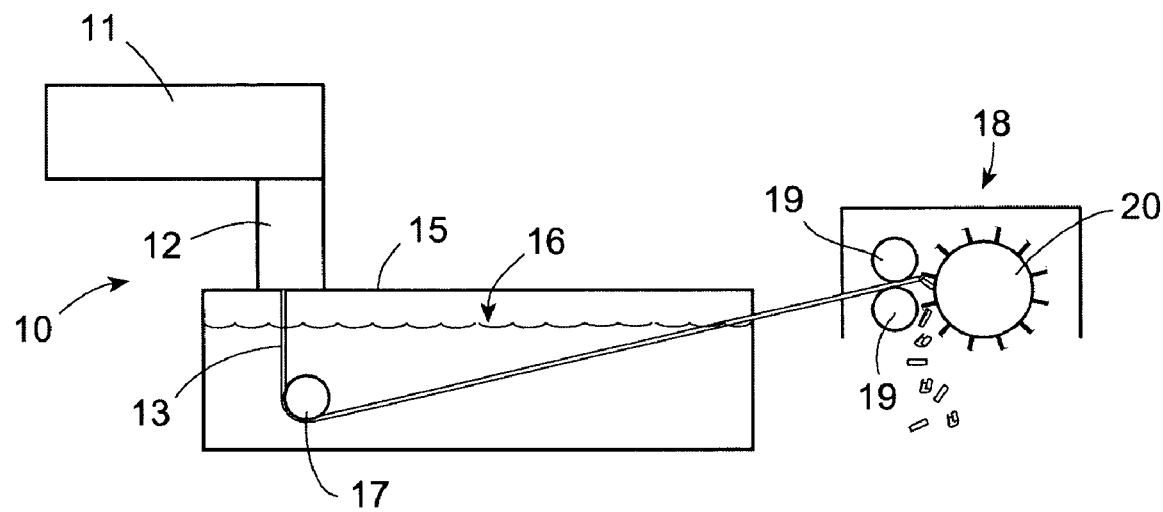
FIG. 1 schematically illustrates an apparatus for making loose filled elements in accordance with the invention.
Figure 2:
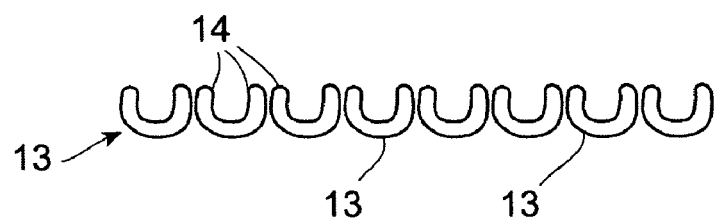
FIG. 2 illustrates a cross-sectional view of a plurality of die openings in the die of FIG. 1.

Referring to FIG. 1, the apparatus 10 includes an extruder 11 of conventional structure for extruding a heat-plastified mass of thermal plastic material containing an expanding agent therethrough. The extruder includes a die 12 at one end with a plurality of orifices for extrusion of the heat-plastified mass therethrough in a downward direction in the form of an elongated extradites or rods 13. Each orifice has a C-shaped cross-section as illustrated in FIG. 2 to form the extrudate with a corresponding C-shaped cross-section having a pair of legs 14 defining an opening therebetween. Typically, the shape of the orifice corresponds to that of a circle with an arcade segment removed.

The apparatus 10 also includes a tank 15 disposed below the die 12 for holding a bath of liquid, for example water 16, for cooling of the extrudate 13 into a latent foaming state.

At least one guide roller 17 is mounted in the tank 15 for emergence within the bath of water 16 and for passage of the extrudate 13 thereon with the legs of the C-shaped cross-section directed away from the guide roller 17. As illustrated, the guide roller 17 is located below the surface of the water, for example 6 inches below the surface of the water. In this regard, the immersion of the guide roller 17 in the bath of water 16 may be adjusted depending upon the rate of cooling of the extrudate 13. In this respect, the extrudate is relatively hot and soft upon leaving the die 12. Upon entering the bath of water 16, the extrudate 13 begins to harden.

As is known, the cooling of the extrudate 13 upon leaving the die 12 forms a tough skin on the periphery of the extrudate 13 that traps the expanding agent within the cells of he extrudate and prevents expansion of the extrudate 13.

The apparatus also includes a pellitizer 18 downstream of the tank 15. This pellitizer 18 includes a means in the form of a pair of pull rollers 19 for pulling the cooled extrudate 13 through the tank 15 and about the guide roller 17 as well as a cutter 20 for cutting the cooled extrudate 13 passing from the pull rollers 19 into discrete pellets.

In accordance with the invention, upon passage of the extrudate 13 about the guide roller 17, one of the legs 14 of the extrudate 13 deforms inwardly towards the other leg 14 to at least partially close the opening therebetween. During this time, the other leg does not deform.

The orifice (not shown) of the die 12 is disposed on a vertical axis in order to direct the extrudate 13 vertically downward on a vertical axis. The guide roller 17 is disposed on a horizontal axis and is skewed relative to the vertical axis of the extrudate 13. In this respect, the guide roller 17 is mounted in a manner so that the entire guide roller 17 may be raised or lowered within the tank 15 and in a manner in which the guide roller 17 may be raised or lowered at one end relative to the opposite end by suitable means so that the guide roller 17 may be skewed relative to the extrudate 13.

The operating parameters of the apparatus 10 may be varied in order to obtain a latent foaming extrudate 13 that can be palletized without shattering These operating parameters include the diameter of the guide roller 17, the temperature of the bath of water 16 and the distance that the extrudate 13 travels in water before passing around the guide roller 17. Where the extrudate 13 exits the die 12 at a temperature of about 210° F. into a water bath 16 approximately 3 inches below the die 12, the guide roller 17 has a diameter of from 1 inch to 6 inches, the temperature of the water bath 16 is from 40° F. to 100° F. and the guide roller 17 is positioned at least 2 inches below the surface of the water bath 16.

The smaller the diameter of the guide roller 17 the greater will be the deformation of one leg of the extrudate relative to the other leg. Also, the warmer the temperature of the water bath 16, the greater the deformation of the leg and the lesser the depth of the guide roller 17 in the water bath 16, the greater the deformation. Typically, these parameters are controlled in order to maintain the extrudate 13 in a soft and pliable state that hardens into a latent foaming state that will not be brittle, that is, will not shatter in the pellitizer 18.

The guide roller 17 may also be provided with circumferential grooves, if desired, to assist the deformation or forming of the extrudate 13. Also, the guide roller 17 may be adjusted up or down to accommodate the desired degree of deformation of the extrudate 13.

The apparatus 10 may also include a suitable container (not shown) for receiving the pellets 21 that are formed in the pellitizer 18 for shipping purposes.

The latent-foaming packing elements, i.e. pellets 21, can be subsequently heated in bulk in order to achieve an expanded condition.

Figure 3:
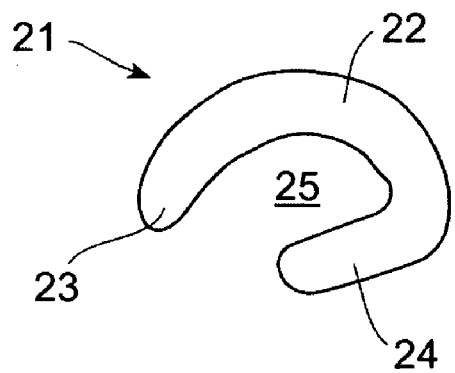
FIG. 3 illustrates?a cross-sectional view of an expanded loose-filled packing element in accordance with the invention.

Referring to FIG. 3, after expanding, the expanded packing element 21 has a similar shape as the unexpanded packing element. In this respect, the expanded loose-filled packing element has a cross-section including a central portion 22, a first leg 23 extending from one end of the central portion 22 and a second leg 24 extending from an opposite end of the central portion 22 in order to define an opening 25 with the first leg 23. In addition, the second leg 24 is directed toward the first leg 23 to at least constrict the opening 25 and is parallel to the central portion 22 of the packing element 21. That is to say, the second leg 24 extends toward the first leg 23 to reduce the mouth of the opening 25. This serves to reduce the risk that another like packing element 21 may interlock or nest within the opening 25.

Figure 4:
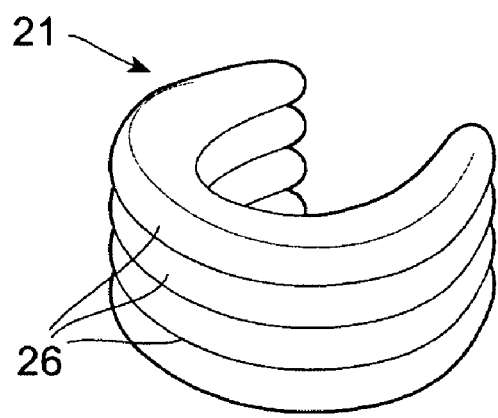
FIG. 4 illustrates a perspective view of the packing element of FIG. 3.

As illustrated in FIG. 4, when expanded, the packing element 21 has a plurality of transverse grooves 26 in an outer surface. These grooves 26 are formed upon expansion of the packing element from the latent-foaming stage and also impart a spring-like characteristic to the packing element 21 in a longitudinal direction.

Figure 5:
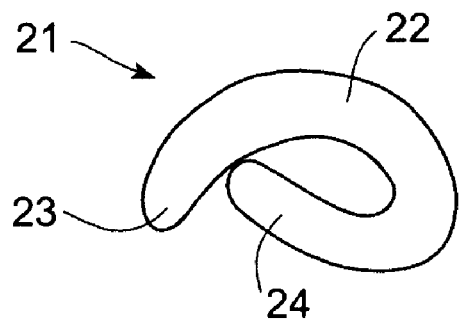
FIG. 5 illustrates a cross-sectional view of a further packing element made in accordance with the invention.

In the embodiment illustrated in FIG. 5, wherein like reference characters indicate like parts as above, the packing element 21' has the inwardly directed leg 24' curled inwardly to abut the opposite first leg 23 thereby completely closing the mouth to the opening 25. Depending upon the skewing of the guide roller 17 relative to the extrudate 13, the degree of deformation of the second leg 24' of the extrudate 13 can be made more or less pronounced. For example, the greater the skewing the more likely the shape as shown in FIG. 5 is obtained. Conversely, the less the skewing, the more likely is that the shape shown in FIG. 3 will be obtained.

As illustrated in FIG. 3, the first leg is curvilinear and defines a partial C-shaped cross-section with the central portion which is also curvilinear.

The swirl shaped packing element 21 has a uniform thickness e.g. in a range of from ⅛ inch to ⅜ inch, that is a uniform transverse cross-sectional thickness as viewed in FIG. 3. This provides several advantages in the fabrication of the packing elements. For example, the rate of expansion of the element is substantially uniform throughout the cross-section, the rate of air drying is substantially uniform and the rate of curing is substantially uniform. All of these factors require less energy to effect than for conventional foamed plastic filling elements.

The uniform thickness of the packing element 21 allows the transfer of air into the closed cells of the element during expansion from the latent foaming state. For example, in a first stage expansion, the elements are heated by steam at a temperate of from 200° to 230° F. for 1 to 5 minutes and then allowed to cool and cure for 8 to 30 hours. During this time, the blowing agent, e.g. pentane, expands when heated to fill the closed cells of the element and then condenses during cooling. Upon condensing of the pentane, partial vacuums forms in the the closed cells. As a result, air is drawn through the element into the closed cells. This first stage expansion is followed by a second stage expansion using steam at a temperature of from 200° F. to 230° F. for 1 to 1.5 minutes and then allowed to cool and cure for 8 to 15 hours to obtain a loose fill packing element having a density of from 0.21 to 0.25 pounds per cubic foot. This is a lesser weight per cubic foot than obtained by conventional two-stage expanded filling elements. The second stage expansion is followed by a third stage expansion using steam at a temperature of from 200° F. to 230° F. for 1 to 2 minutes and then allowed to cool and cure in a storage hopper for 8 to 18 hours to obtain a dried loose fill packing element having a density of from 0.13 to 0.20 pounds per cubic foot. This is a lesser weight per cubic foot than conventional loose fill foamed plastic elements. The invention thus allows an overall reduction in curing times saving energy and obtains a less dense product that has a greater surface area to weight ratio than previous loose fill packing elements of like material.

The loose fill packing element has a spring characteristic and is characterized in allowing air to freely pass over the elements when in storage, in allowing air to pass from the closed cells of the element to quicken curing, and in allowing a faster heating and cooling due to the greater surface area to weight ratio.

Because of the swirl shape, the opening into the packing element is constricted so that one element will not readily interlock with another element. Further, because of the curling in of the one leg, the packing element acts as a spring when pressed by other elements, for example, in a shipping carton. This, in turn, prevents the elements from shifting or migrating.

The invention thus provides a packing element that can be easily manufactured and one which occupies a maximum space with a minimum of weight.

Further, the invention provides a loose-fill packaging material composed of elements that can be shipped in bulk at reduced cost.

What is claimed is:

1. An apparatus for making loose fill elements comprising an extruder for extruding a heat-plastified mass of thermoplastic material containing an expanding agent therethrough, said extruder having a die at one end with at least one orifice disposed on a vertical axis for extrusion of the heat-plastified mass therethrough in a vertically downward direction in the form of an elongated extrudate, said orifice having a C-shaped cross-section to form said extrudate with a C-shaped cross-section having a pair of legs defining an opening therebetween;

a tank disposed below said die for holding a bath of liquid therein for cooling of the extrudate into a latent foaming state;

at least one guide roller mounted in said tank for immersion within a bath of liquid therein and for passage of the extrudate thereover with the legs of said C-shaped cross-section directed away from said guide roller;

a pelletizer downstream of said tank, said pelletizer including at least a pair of pull rollers for pulling the cooled extrudate through said tank and about said guide roller and a cutter for cutting the cooled extrudate passing from said pull rollers into discrete pellets whereby upon passage about said guide roller, one of the legs of the extrudate deforms inwardly towards the other of said legs to at least partially close the opening therebetween.

2. An apparatus as set forth in claim 1 wherein said guide roller is disposed on a horizontal axis.

3. An apparatus as set forth in claim 2 wherein said guide roller is skewed relative to said vertical axis.

4. An apparatus for making loose fill elements comprising an extruder for extruding a heat-plastified mass of thermoplastic material containing an expanding agent therethrough, said extruder having a die at one end with at least one orifice disposed on a vertical axis for extrusion of the heat-plastified mass therethrough in a vertically downward direction in the form of an elongated extrudate, said orifice having a C-shaped cross-section to form said extrudate with a C-shaped cross-section having a pair of legs defining an opening therebetween;

a tank disposed below said die;

a bath of water in said tank for cooling of the extrudate into a latent foaming state;

at least one guide roller mounted in said tank within said bath of water for passage of the extrudate thereover with the legs of said C-shaped cross-section directed away from said guide roller;

means for pulling the cooled extrudate through said tank and about said guide roller; and a cutter for cutting the cooled extrudate passing from said means into discrete pellets whereby upon passage about said guide roller, one of the legs of the extrudate deforms inwardly towards the other of said legs to at least partially close the opening therebetween.

5. An apparatus as set forth in claim 4 wherein said guide roller is disposed on a horizontal axis.

6. An apparatus as set forth in claim 5 wherein said guide roller is skewed relative to said vertical axis.

7. An apparatus as set forth in claim 4 wherein said means includes a pair of pull rollers for pulling the extrudate therebetween.

8. An apparatus as set forth in claim 4 wherein said guide roller is disposed six inches below the surface of the water in said tank.

* * * * *